United States Patent [19]
Agustin et al.

[11] Patent Number: 6,003,309
[45] Date of Patent: Dec. 21, 1999

[54] DIAGNOSTIC APPARATUS FOR EXHAUST GAS CLARIFICATION APPARATUS FOR INTERNAL COMBUSTION ENGINE

[75] Inventors: Rogelio B. Agustin, Hitachinaka; Akihito Numata, Urizura-machi; Eisaku Fukuchi, Hitachi; Yutaka Takaku; Toshio Ishii, both of Mito, all of Japan

[73] Assignees: Hitachi, Ltd.; Hitachi Car Engineering Co., Ltd., both of Japan

[21] Appl. No.: 08/985,059

[22] Filed: Dec. 4, 1997

Related U.S. Application Data

[63] Continuation of application No. 08/603,345, Feb. 20, 1996, Pat. No. 5,740,676.

[30] Foreign Application Priority Data

Feb. 17, 1995 [JP] Japan ........................... 7-29737

[51] Int. Cl.$^6$ ........................................... F01N 3/00
[52] U.S. Cl. .......................... 60/276; 60/277; 60/288
[58] Field of Search ........................ 60/276, 277, 288

[56] References Cited

U.S. PATENT DOCUMENTS

| | | | |
|---|---|---|---|
| 4,817,385 | 4/1989 | Kumagai | 60/277 X |
| 5,349,816 | 9/1994 | Sanbayashi et al. | 60/277 |
| 5,467,594 | 11/1995 | Aoki et al. | 60/276 |
| 5,509,267 | 4/1996 | Theis | 60/277 |
| 5,522,219 | 6/1996 | Orzel et al. | 60/277 X |
| 5,524,433 | 6/1996 | Adamczyk, Jr. et al. | 60/277 X |
| 5,544,482 | 8/1996 | Marsumoto et al. | 60/277 X |
| 5,758,491 | 6/1998 | Agustin et al. | 60/277 X |

FOREIGN PATENT DOCUMENTS

| | | | |
|---|---|---|---|
| 616115 | 9/1994 | European Pat. Off. | 60/288 |
| 57-210116 | 12/1982 | Japan | 60/288 |
| 63-97852 | 4/1988 | Japan . | |
| 5-26032 | 2/1993 | Japan . | |
| 5-231138 | 9/1993 | Japan | 60/288 |
| 6-159044 | 6/1994 | Japan | 60/277 |

OTHER PUBLICATIONS

Patent Abstract of Japan, JP 6–117310 dated Apr. 26, 1994.
Patent Abstract of Japan, JP 6–010738 dated Jan. 18, 1994.
Patent Abstract of Japan, JP 6–159044 dated Jun. 7, 1994.
European Search Report dated May 30, 1996.

*Primary Examiner*—John E. Ryznic
*Attorney, Agent, or Firm*—Evenson, McKeown, Edwards & Lenahan, P.L.L.C.

[57] ABSTRACT

A diagnostic apparatus for exhaust gas clarification apparatus for internal combustion engine diagnoses the individual catalyst independently by an air/fuel ratio sensor mounted before and after the individual catalyst. The individual catalyst is diagnosed by estimating the correlation of the output signals from the air/fuel ratio sensors mounted before and after the individual catalyst. The individual diagnosis operation is performed at distinctive operation regions adequate for their corresponding diagnostic mode. A by-pass route is provided for by-passing the exhaust gas from the upstream catalyst, and a by-pass valve switches the exhaust gas flow into the upstream catalyst or into the by-pass routes. A cross-correlation function calculation valve based upon outputs from air/fuel ratio sensors permits diagnosis of degradation of the overall catalyst.

4 Claims, 5 Drawing Sheets

DIAGNOSTIC APPARATUS FOR EXHAUST GAS CLARIFICATION APPARATUS FOR INTERNAL COMBUSTION ENGINE

This application is a continuation of application Ser. No. 08/603,345, filed Feb. 20, 1996, now U.S. Pat. No. 5,740,676.

BACKGROUND OF THE INVENTION

The present invention relates to a diagnostic apparatus for an exhaust gas clarification apparatus of an internal combustion engine using a plurality of catalyst converters arranged in series configuration, more specifically, to a diagnostic apparatus for an exhaust gas clarification apparatus of an internal combustion engine which diagnoses a status of the clarification apparatus by judging output signals from a plurality of air/fuel ratio sensors installed in the upper stream and the down stream of said plurality of catalyst converters.

An apparatus for clarifying the combustion exhaust gas in the internal combustion engine is generally composed of catalyst converters and an air/fuel ratio feedback control apparatus. A catalyst converter is mounted in the exhaust pipe for removing hazardous components in the exhaust gas, specifically including HC, NOx and CO. An air/fuel ratio feedback control apparatus is aimed to keep the air/fuel ratio constant in order to make the best use of function of catalyst converters, and controls the amount of fuel supplied to the engine in responsive to the air/fuel ratio which is obtained with an air/fuel ratio sensor or an oxygen sensor mounted on the upper stream of the catalyst converter in the exhaust gas pipe.

The three-way catalyst used in the above described catalyst converters has such a problem that the clarification performance is degraded even within the durable time predefined based on the expected aged-deterioration because the impurity materials stick to the catalyst part of the catalyst converters when supplying lead gasoline to the internal combustion engine as fuel.

As for the above described problem, in such a proposed system as disclosed in Japanese Laid-Open Patent 97852 (1988), a secondary exhaust gas sensor for detecting oxygen density is so located in the down stream side of the catalyst converter in the exhaust system of the internal combustion engine as to judge the degradation of catalyst operation performance of the catalyst converter by referring to the number of altering output signals in the air/fuel ratio feedback control with the secondary exhaust gas sensor. In this proposed system, what is aimed is that there is no difference between the oxygen density in the down stream side of the catalyst and that in the upper stream of the catalyst due to the decease in the oxygen absorption power of the catalyst when the catalyst operation performance is degraded, and that this indifference is used for judging indirectly the degradation of the catalyst.

As for the prior art related to the diagnosis of plurality of catalysts arranged in series in the exhaust gas system, an example is disclosed in Japanese Laid-Open Patent 26032 (19993). In this prior art system, a secondary (second) exhaust gas sensor is installed in the in-between part between the upper stream catalyst converter and the down stream catalyst converter in the exhaust gas system, and a tertiary (third) exhaust gas sensor is installed in the down stream part of the down stream catalyst. In this system, under the air/fuel ratio feedback control based on the primary (first) exhaust gas sensor, the degradation of the upper stream catalyst is judged by referring to the number of inversions in the second exhaust gas sensor. In addition, under the air/fuel ratio feedback control based on the second exhaust gas sensor, the degradation of the upper stream catalyst is judged by referring to the number of inversions in the third exhaust gas sensor.

In such a prior art as having a plurality of catalysts arranged in series in the exhaust gas system, the following problem arises when simply applying a configuration including an exhaust gas sensor located in the down stream side of the down stream catalyst converter and judging the degradation of the catalyst based on the changes in the output signal from this sensor.

As the components and their individual concentration of the combustion exhaust gas supplied to the upper stream catalyst converter is different from those of the gas supplied to the down stream catalyst converter, the degree of degradation varies with the individual catalyst converters, which leads to the difficulty in keeping stable reliability.

Regarding to the above problem, what may be considered is such a solution that an exhaust gas sensor for judging the degradation of the upper stream catalyst is mounted in the in-between part between the upper stream catalyst converter and the down stream catalyst converter in the exhaust gas system. However, as larger amount of oxygen in the exhaust gas is absorbed in the upper stream and down stream catalyst converters compared with the case of using a single unit of catalyst converter, the partial pressure of oxygen in the combustion exhaust gas in the down stream side of the down stream catalyst converter does not change extremely when the air/fuel ratio feedback control is based on the output signal from the exhaust gas sensor located in the upper stream side of the upper stream catalyst converter. Under this circumstance, any explicit change in the output signal from the exhaust gas sensor located in the down stream side of the down stream catalyst converter can not be seen other than the case that the catalyst performance is extremely degraded, which leads to the problem that the accuracy in degradation judgment of the down stream catalyst converter may be reduced.

Thus, in the prior art, as an attempt is made to solve above described problems by applying an air/fuel ratio feedback control based on the output signal from the exhaust gas sensor installed in the in-between part of the upper stream and down stream catalysts. However, as engine control parameters are forced to be changed for diagnostic operations for the degradation of catalyst, another new problem including by-effect to exhaust system characteristic and performance should be considered.

SUMMARY OF THE INVENTION

An object of the present invention is, especially in an exhaust gas clarification apparatus of the internal combustion engine having a plurality of catalysts, to provide a diagnostic system enabling to diagnoses the individual catalyst independently by means that an air/fuel ratio sensor is mounted before and after the individual catalyst, and that the individual catalyst is diagnosed by estimating the correlation of the output signals from the air/fuel ratio sensors mounted before and after the individual catalyst, and furthermore, that the individual diagnosis operation is performed at distinctive operation regions adequate for their corresponding diagnostic mode.

The diagnostic apparatus of the exhaust gas clarification apparatus of the internal combustion engine comprises a plurality of exhaust gas clarification catalysts in the exhaust gas route in the internal combustion engine having a means for detecting the operation status of the internal engine, and an air/fuel ratio control means for regulating the amount of fuel injection so as to keep the constant air/fuel ratio in the exhaust gas; the first air/fuel ratio sensor located in the upper stream of the upper stream catalyst in the exhaust gas route; the second air/fuel ratio sensor located between the upper stream catalyst and the down stream catalyst in the exhaust gas route; the third air/fuel ratio sensor located in the down stream of the down stream catalyst; a diagnostic means for performing the diagnosis of the upper stream catalyst based on the output signals from the first air/fuel ratio sensor and the second air/fuel ratio sensor; and further a diagnostic means for performing the diagnosis of the overall catalyst apparatus including the upper stream catalyst and the down stream catalyst by using the first air/fuel ratio sensor and the third air/fuel ratio sensor; and a means for diagnosing the down stream catalyst in the exhaust gas route based on the diagnostic information of the upper stream catalyst in the exhaust gas route and the overall catalyst apparatus, that is, a means for estimating the degree of degradation of the down stream catalyst in the exhaust gas route by referring to the data map which is formed as a two dimensional matrix defined by a couple of axis representing the diagnosis information of the upper stream catalyst and the diagnosis information of the overall catalyst apparatus.

In diagnostic apparatus of the exhaust gas clarification apparatus of the internal combustion engine in the present invention, the internal combustion engine operation region adequate for the diagnosis of the upper stream catalyst in the exhaust gas route and the internal combustion engine operation region adequate for the diagnosis of the overall catalyst apparatus are defined as distinctive regions, and the diagnosis of the overall catalyst apparatus is performed in the operation region with higher load than the operation region for the diagnosis of the upper stream catalyst in the exhaust gas route.

In diagnostic apparatus of the exhaust gas clarification apparatus of the internal combustion engine in the present invention, in case that the difference between the clarification power of the upper stream catalyst and that of the down stream catalyst is larger than a designated value, the diagnosis of the down stream catalyst is performed based on both the output signals from the first air/fuel ratio sensor and the third air/fuel ratio sensor, and the output signals from the second air/fuel ratio sensor and the third air/fuel ratio sensor, or either one of the output signals.

The catalyst diagnostic method of the diagnostic apparatus of the exhaust gas clarification apparatus of the internal combustion engine so configured as in above description in the present invention uses the correlation method for obtaining the correlation between the output signals from the air/fuel ratio sensors mounted before and after the catalyst. This method uses the principle that, if the upper stream catalyst or the down stream catalyst is not degraded, the change in the air/fuel ratio becomes smaller in the down stream of the catalyst due to the oxidation and reduction operation by the catalyst, and therefore the changes in the detected signal of the air/fuel ratio sensor in the down stream changes less; on the other hand, if the catalyst apparatus is degraded, the change in the air/fuel ratio in the down stream catalyst is much closely correlated to the change in the air/fuel ratio in the upper stream catalyst. The degradation of the catalyst is diagnosed with the above point of view related to the similarity of changes in the air/fuel ratio measured before and after the catalyst apparatus.

As a measure representing the similarity of changes in the air/fuel ratio measured before and after the catalyst apparatus, the cross-correlation function of the detected signal from the air/fuel ratio sensors before and after the catalyst apparatus is calculated The higher the similarity of changes in the air/fuel ratio, that is, the output signals of the air/fuel ratio sensor measured before and after the catalyst apparatus, the higher the value of the cross-correlation function.

By cross-correlation function calculation based on the correlation method, the cross-correlation function value of the output signals from the first air/fuel ratio sensor and the second air/fuel ratio sensor is calculated, and then, the degradation of the upper stream catalyst is diagnosed. And, by correlation function calculation means, the correlation function value of the first air/fuel ratio sensor and the third air/fuel ratio sensor is calculated, and then, the degradation of the overall catalyst apparatus including the upper stream catalyst and the down stream catalyst is diagnosed.

The calculation of the individual correlation function is performed after verifying that the operation status of the internal combustion engine is located in the catalyst diagnosis region.

In the diagnostic apparatus of the exhaust gas clarification apparatus of the internal combustion engine in the present invention, a by-pass route for by-passing the exhaust gas from the upper stream catalyst, and a by-pass valve for switching the exhaust gas flow into the upper stream catalyst or into the by-pass route are installed, and also with the second air/fuel ratio sensor is located at the upper stream part or the down stream part of the outlet port of the by-pass route, the problem related to the reduction of reliability in diagnosis for the down stream catalyst can be resolved, and the independent and individual diagnosis of the upper stream catalyst and the down stream catalyst is enabled.

DESCRIPTION OF THE PREFERRED EMBODIMENTS

Figure 1:
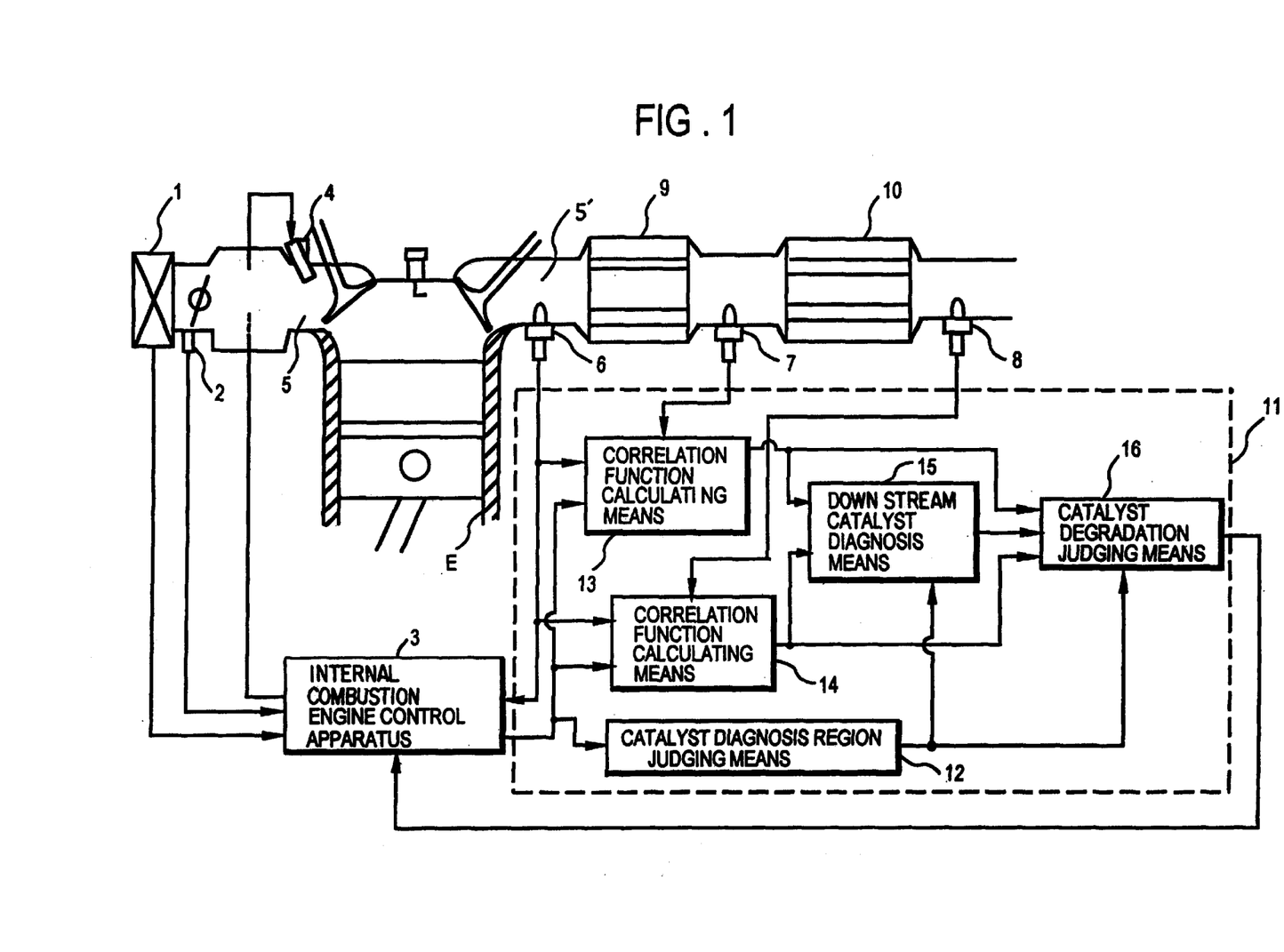
FIG. 1 is a basic schematic diagram of the diagnostic apparatus of the exhaust gas clarification apparatus of one embodiment in the present invention.

FIG. 1 is a basic schematic diagram of the diagnostic apparatus of the exhaust gas clarification apparatus for the internal combustion engine in the present invention.

In the system of this embodiment, the amount of intake air passing through the air cleaner and the throttle valve, both not shown, and through the throttle sensor 2 for detecting the throttle angle is measured by the air flow sensor 1. The control apparatus 3 of the internal combustion engine calculates an optimal amount of fuel injection by judging the measured values from the air flow sensor 1 and the rotation sensor not shown, and controls the internal combustion engine so that the fuel may be injected by the injector 4 based on the calculated values.

The mixed gas of air and fuel so obtained by the measurement and the calculation as shown above is taken through the intake manifold 5 into the inner chamber of the combustion chamber of the inner combustion engine E, and is exhausted after completing the processes of compression, explosion and expansion of the inner combustion engine E. The first air/fuel ratio sensor 6 is made to be mounted in the midst of the exhaust manifold 5' or at the end of the exhaust manifold 5' in order to detect the density of oxygen in the exhaust gas and the amount of fuel injection from the injector 4 is corrected by the detected signal of the first air/fuel ratio sensor 6. In the system of this embodiment, what is established is a catalyst apparatus including the upper stream catalyst converter 9 and the down stream catalyst converter 10, both so arranged in series as to be served as a clarification means for combustion exhaust gas.

The second air/fuel ratio sensor 7 is installed in the down stream of the upper-stream catalyst converter 9, and the third air/fuel ratio sensor 8 is installed in the down stream of the down stream catalyst converter 9. Though an oxygen sensor is used as an air/fuel ratio sensor in this embodiment, it may be allowed to use another type of air/fuel ratio sensor.

Each part of the catalyst diagnostic part 11 of the system in this embodiment is described. An input signal describing the operation status of the internal combustion engine is supplied to the catalyst diagnosis region judging means 12 in which whether the operation status of the engine is located in the region adequate for rational judgment of the catalyst converters is judged.

In catalyst diagnosis for the catalyst apparatus in this embodiment, a correlation method for the correlation between the output signals of the air/fuel ratio sensors installed before and after the catalyst. In case that the upper stream catalyst converter 9 or the down stream catalyst converter 10 is not degraded, the change in the air/fuel ratio at the down stream of the catalyst apparatus becomes smaller owing to the oxidation and reduction operation by the catalyst, which leads to the smaller change in the detected signal by the air/fuel ratio sensor 8 at the down stream. On the other hand, in case that the catalyst become degraded, the change in the air/fuel ratio at the upper stream becomes closer to that in the air/fuel ratio at the down stream. Thus, the principle of diagnosis of the degradation of the catalyst is to consider the similarity between the changes in the air/fuel ratio before and after the catalyst.

As a measure representing the similarity between the changes in the air/fuel ratio before and after the catalyst, the cross-correlation function of the detected signals from the air/fuel ratio sensors, one installed before the catalyst apparatus and the other installed after the catalyst apparatus. The correlation function takes a larger value if the similarity between the changes in the air/fuel ratio before and after the catalyst is larger, and on the other hand, the function takes a smaller value if the similarity is smaller.

Any other measure which could represent the similarity between the changes in the air/fuel ratio before and after the catalyst can be applicable other than the value of cross-correlation function in order to evaluate the degradation of the catalyst.

By cross-correlation function calculation means 13 using the correlation method, the correlation function value of the output signals from the first air/fuel ratio sensor 6 and the second air/fuel ratio sensor 7 is calculated, and the degradation diagnosis of the upper stream catalyst converter 9 is performed with the calculated value. By cross-correlation function calculation means 14 using the correlation method, the correlation function value of the output signals from the first air/fuel ratio sensor 6 and the third air/fuel ratio sensor 8 is calculated, and the degradation diagnosis of the overall catalyst apparatus including the upper stream catalyst converter 9 and the down stream catalyst converter 10 is performed with the calculated value.

The calculation of the individual correlation functions is started when the catalyst diagnosis region judging means 12 judges that the operation status of the internal combustion engine is located within the catalyst diagnosis region. The conditions used for this judgment include at least the number of engine rotations, load, the amount of intake air, the feedback condition for the air/fuel ratio, the catalyst temperature and so on.

The cross-correlation function calculation means 13 and the cross-correlation function calculation means 14 have at least a sampling means for the output signals from the air/fuel ratio sensors 6, 7 and 8, and a signal processing means for the output signals from the air/fuel ratio sensors 6, 7 and 8.

And next, in the down stream catalyst diagnosis means 15, the degree of degradation of the down stream catalyst 10 is estimated by the diagnosis result of the upper stream catalyst 9 and the diagnosis result of the overall catalyst apparatus. The estimation method of the degree of degradation of the down stream catalyst 9 uses a value referred from the degradation map for the down stream catalyst 10 which is formed as a two dimensional matrix defined by a couple of axis representing the diagnosis result of the upper stream catalyst 9 and the diagnosis result of the overall catalyst apparatus 10.

The individual calculated value of the correlation functions is supplied to the degradation judging means 16, and is compared with the threshold value prepared for judging the degree of degradation for the individual type of catalyst, and in case that the calculated value is proved to be larger than its corresponding threshold value, the catalyst is judged to be degraded. The operation status of the engine when the diagnosis is undergone is supplied into the degradation judging means 16, and the judging result based on the operation status is also corrected. In addition, in case that the catalyst is judged to be degraded with the memorized result of the above described judgment, the failure of the catalyst is reported, for example, by lightning an alarm display lamp.

One of the characteristic points of the diagnostic system in this embodiment is to performs the individual calculations of the correlation functions at their distinctive operation regions rather than simultaneously. For example, the diagnosis of the upper stream catalyst 9 is performed in an operation region in which the engine is operated with relatively lower load, and the diagnosis of the overall catalyst apparatus is performed in an operation region in which the engine is operated with higher load. Thus, optimal conditions for the individual catalysts can be established with applying different operation regions to the individual diagnostic procedures.

Figure 2:
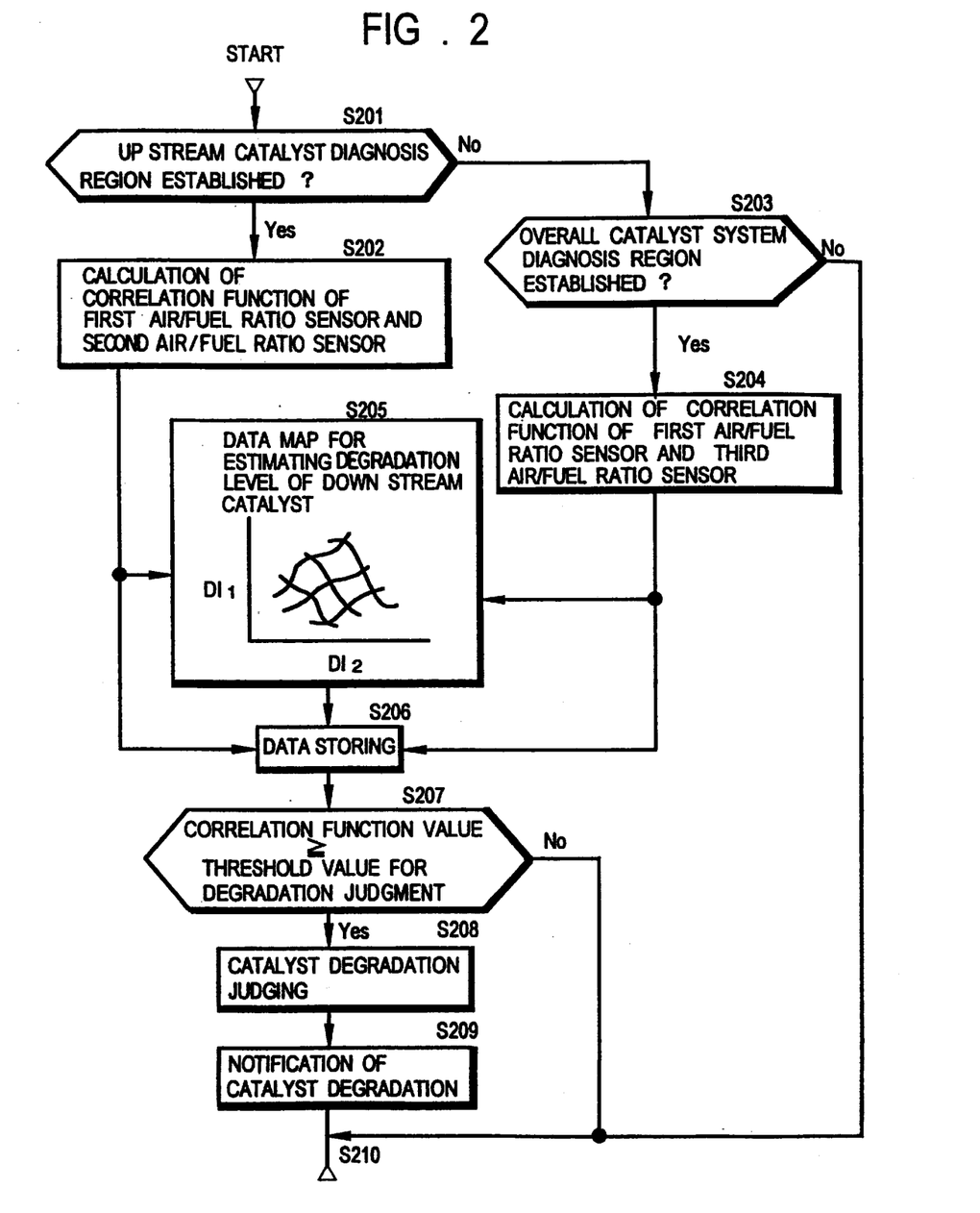
FIG. 2 is a control flow chart of the embodiment shown in FIG. 1.

FIG. 2 is a control flow chart of the diagnostic system in this embodiment, and will be described below.

When the internal combustion engine is started, the control apparatus 3 is initiated for starting the control operation, and the control program starts at first with step S201 where whether the operation region for diagnosis of the upper stream catalyst 9 is established or not is judged. If this region is proved to be established, step S202 is selected as the next step, and next, in step S202 the calculation of the correlation function is performed by the correlation function calculation means 13 based on the output signals from the first air/fuel ratio sensor 6 and the second air/fuel sensor 7.

If step S201 concludes that the operation region is not established, step S203 is selected as the next step, where whether the operation region for the diagnosis of the overall catalyst system is established or not, is judged by the catalyst function calculation means 12. In case that the operation region is proved to be established, step S204 is selected as the next step, where the calculation of the correlation function is performed by the correlation function calculation means 14 based on the output signals from the first air/fuel ratio sensor 6 and the third air/fuel sensor 8.

If step 203 concludes that the operation region for diagnosis of the overall catalyst apparatus is not established, step S210 is selected for going back to the initial step of the flowchart and restarting the control program.

When completing the diagnosis of the upper stream catalyst 9 and the diagnosis of the overall catalyst apparatus, further step S205 is selected next, where the individual diagnostic results of the diagnosis of the upper stream catalyst 9 and the diagnosis of the overall catalyst apparatus are supplied, and the degree of degradation of the down stream catalyst is estimated by using a data map formed as a two dimensional matrix defined by a couple of axis representing the diagnosis result of the upper stream catalyst 9 and the diagnosis result of the overall catalyst apparatus 10.

And next, going forward to step S206, above described three sets of diagnostic results and the estimated value for the degree of degradation of the down stream catalyst are stored in the memory, and then step S207 is selected as the next step.

In step S207, the diagnostic result of the upper stream catalyst 9, the diagnostic result of the overall catalyst apparatus, and the estimated value for the degree of the degradation of the down stream catalyst are compared with their corresponding threshold value for degradation judgment, respectively. In case that any one of the diagnostic results so obtained above is judged to exceed the threshold value, step S208 concludes that its corresponding catalyst is degraded, and next, step S209 is selected as the next step. In step S209, the fact that the specific catalyst is degraded is reported to the driver.

In case that all of the diagnostic results so obtained above are judged not to exceed the threshold value, step S210 is selected for going back to the initial step of the flowchart and restarting the control program.

Figure 3:
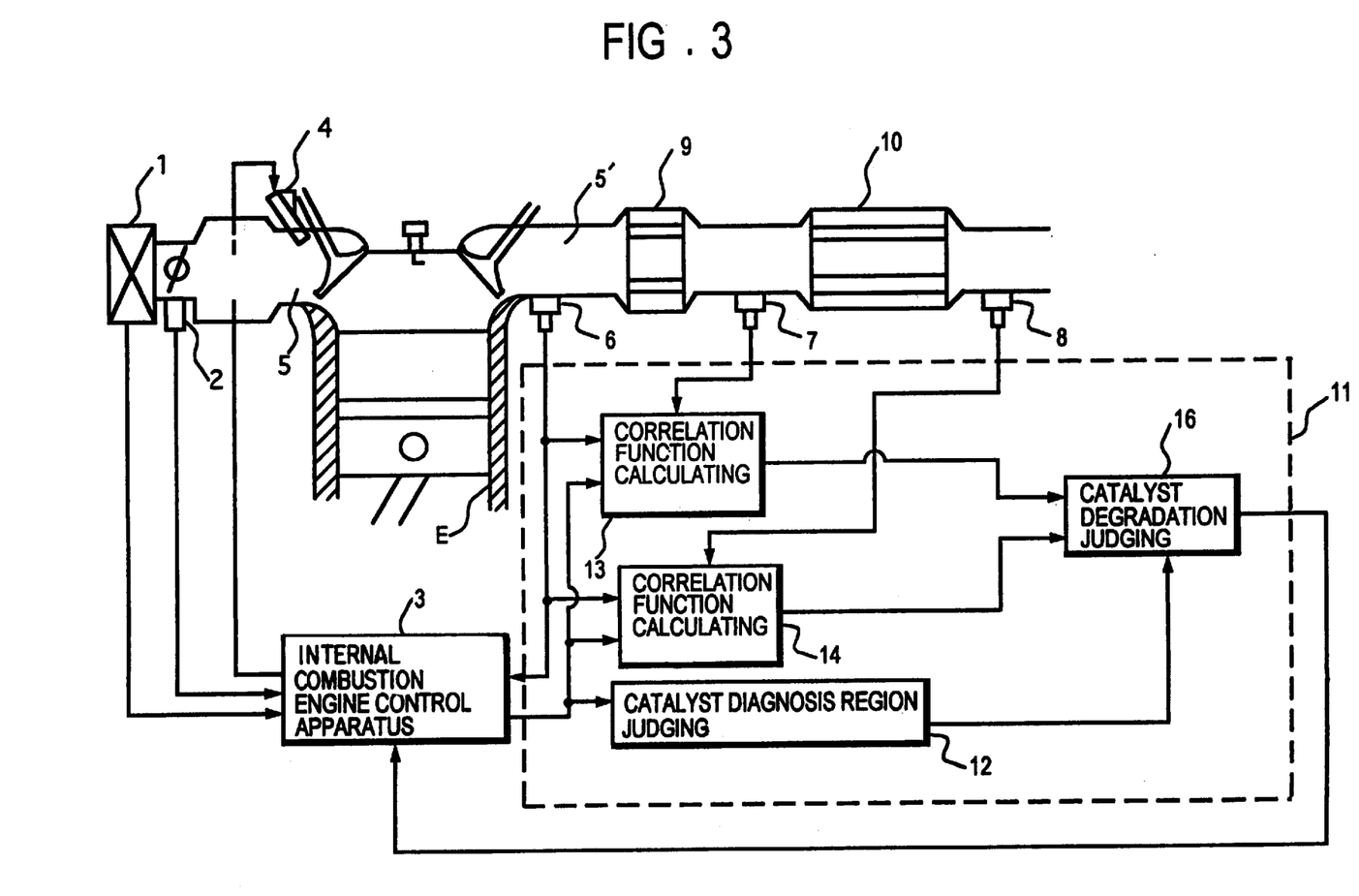
FIG. 3 is a basic schematic diagram the diagnostic apparatus of the exhaust gas clarification apparatus shown in FIG. 1 with its catalyst diagnosis part modified.

The diagnostic system as shown in FIG. 3 is assumed to be applied to the case that the difference between the clarification ability of the upper stream catalyst 9 and that of the down stream catalyst 10 is emerged (for example, the clarification power of the down stream catalyst 10 is larger than that of the upper stream catalyst 9). In this diagnostic system, the diagnosis of the down stream catalyst is made possible by using the correlation between the output signals from the first air/fuel ratio sensor 6 and the third air/fuel ratio sensor 8, or the correlation between the output signals from the second air/fuel ratio sensor 7 and the third air/fuel ratio sensor 8. The diagnostic method of the diagnostic system shown in FIG. 1 can be also applied to this diagnostic system shown in FIG. 3. As the diagnosis of the down stream catalyst 10 can be performed directly, in the diagnostic system shown in FIG. 3, the down stream catalyst diagnosis means 15 is not necessary as well as the degradation degree estimation map for the down stream catalyst 10 is not. In case that it is necessary to obtain the degradation status of the overall catalyst apparatus, this can be estimated by using the individual diagnostic results of the upper stream catalyst 9 and the down stream catalyst 10. For example, this estimation calculation may use a degradation status data map formed as a two dimensional matrix defined by a couple of axis representing the diagnosis result of the upper stream catalyst 9 and the diagnosis result of the overall catalyst apparatus 10.

The diagnostic system shown in FIGS. 1 and 3 has a means for correcting the air,fuel ratio feedback control based on the output signal from the air/fuel ratio sensor 7 or performing the air/fuel ratio feedback control based on the air/fuel ratio sensor 7 when the correlation value of the output signals from the air/fuel ratio sensors 6 and 7 mounted before and after the upper stream catalyst respectively.

Figure 4:
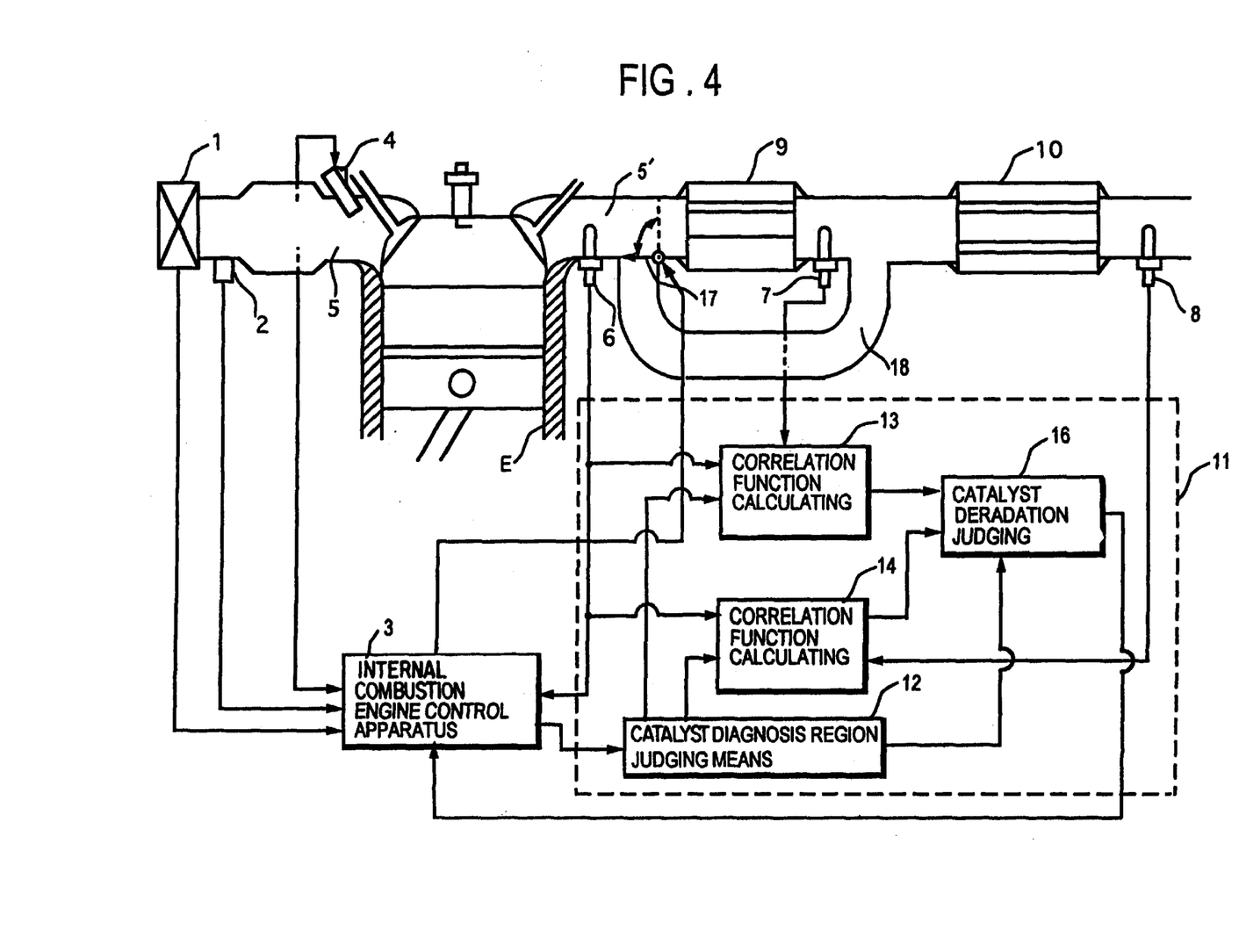
FIG. 4 is a basic schematic diagram of the diagnostic apparatus of the exhaust gas clarification apparatus of another embodiment in the present invention.

FIG. 4 is a schematic diagram of the diagnostic apparatus in another embodiment of the present invention. The major difference from the diagnostic system described in the previous embodiment is to arrange the by-pass valve 17 and the by-pass route 18 for by-passing the exhaust gas directly to the down stream catalyst. In FIG. 4, similar parts and means are designated identical. numbers which are not explained here.

In the diagnostic system of this embodiment, the by-pass valve 17 is made to open when performing the diagnosis of the down stream catalyst 10 in order to allow the total volume of the exhaust gas from the engine to pass through the by-pass route 18 and not to go into the down stream catalyst 10. With this configuration, the diagnosis of the down stream catalyst can be performed in the manner similar to that for the single catalyst structure. In this case, the diagnostic condition for the down stream catalyst 10 assumes that the down stream catalyst 10 is fully activated or that the exhaust gas does not suffer from flow obstacle or loss physically. Though the second air/fuel ratio sensor 7 is located in the upper stream side of the outlet port of the by-pass route 18 in FIG. 4, it is allowed to arrange the second air/fuel ratio sensor 7 in the down stream side.

The function of the diagnostic system of this embodiment includes the control of the by-pass valve 17 so as to open in the diagnostic mode as well as in protecting the upper stream catalyst 9 from high temperature gas flow in the high-speed and high-load engine operations.

In the similar manner to the first embodiment, also in the diagnostic system of this embodiment, the upper stream catalyst 9 is diagnosed based on the correlation function of the output signals from the first air/fuel ratio sensor 6 and the second air/fuel ratio sensor 7, and the down stream catalyst 10 is diagnosed based on the correlation function of the output signals from the first air/fuel ratio sensor 6 and the third air/fuel ratio sensor 8. Exceptionally in case that the second air/fuel ratio sensor 7 is. located in the down stream side of the by-pass route 18, it is allowed to diagnose the down stream catalyst 10 based on the, correlation of the output signals from the second air/fuel ratio sensor 7 and the third air/fuel ratio sensor 8. In case of the diagnosis using the correlation between the output signals from the second air/fuel ratio sensor 7 and the third air/fuel ratio sensor 8, as the second air/fuel ratio sensor 7 is so located close enough to the down stream catalyst 10, the time lag between the signal sensing by both air/fuel ratio sensors 7 and 8 can be reduced, and therefore, more precise correlation can be obtained.

Figure 5:
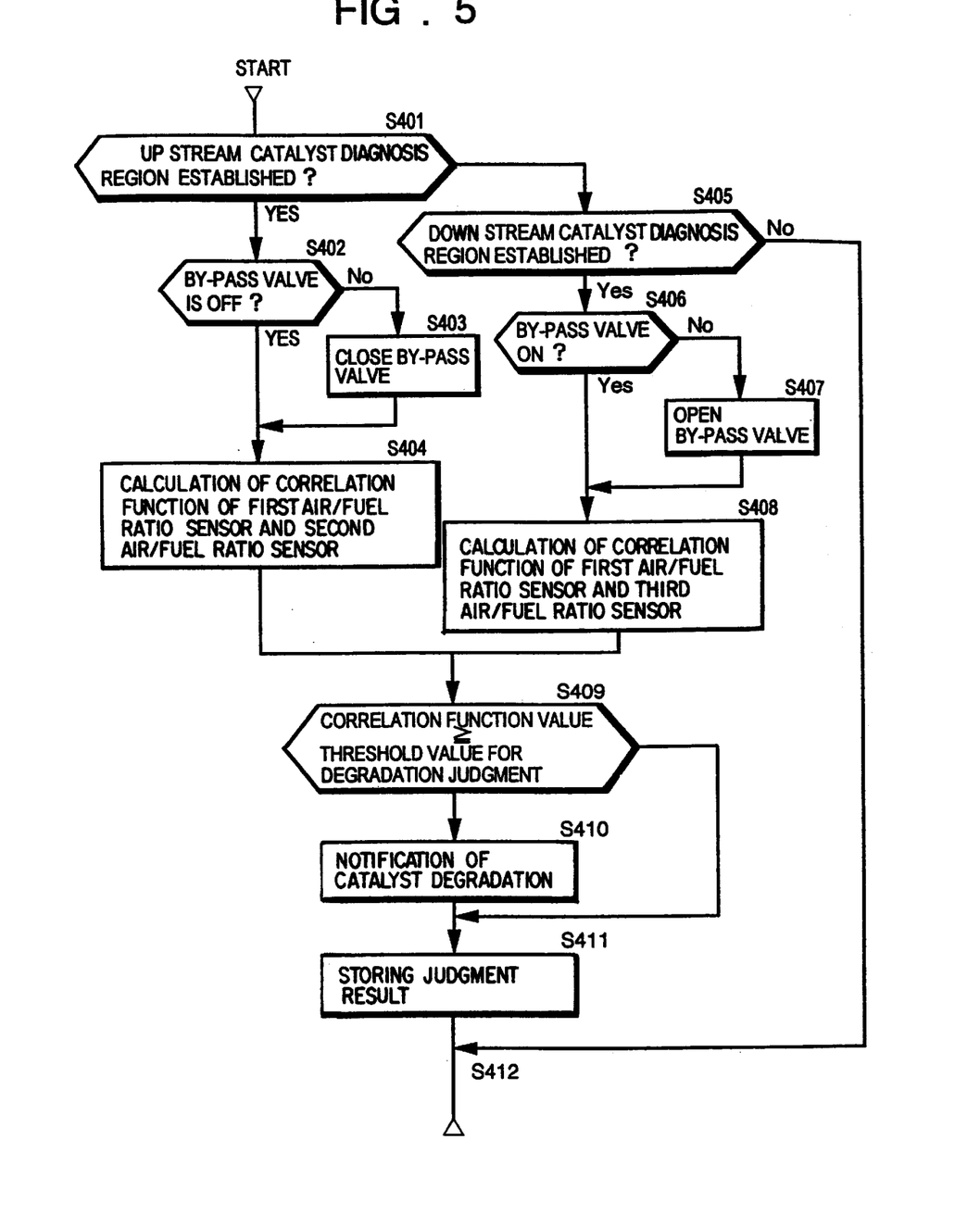
FIG. 5 is a control flow chart of another embodiment shown in FIG. 4.

FIG. 5 is a control flow chart of the diagnostic system of this embodiment, and will be described below.

When the internal combustion engine is started, the control apparatus 3 is initiated for starting the control operation, and the control program starts at first with step S401 where whether the operation region for diagnosis of the upper stream catalyst 9 is established or not is judged. If this region is proved to be established, step S402 is selected as the next step. What is judged in step S402 is whether the by-pass valve 17 is OFF or not, that is, the by-pass route 18 is closed or not. If step S402 concludes that the valve is OFF, step S404 is selected as the next step. If the by-pass route 18 is open, step S403 is selected where the control signal OFF is supplied to the by-pass valve 17 for closing the by-pass route 18, and step S404 is selected next.

In step S404, the correlation function of the output signals from the first and second air/fuel ratio sensors 6 and 7, one located before the upper stream catalyst 9 and the other located after that, is calculated. In case that step S401 concludes that the current operation status is not located in the diagnosis region for the upper stream catalyst 9, step S405 is selected as the next step, where further whether the operation status is located or not in the diagnosis region for the down stream catalyst 10 is judged. In case that the diagnosis region for the down stream catalyst 10 is established, step S406 is selected further and whether the by-pass valve 17 is ON, that is, the by-pass route 18 is open or not is judged. In case that the by-pass valve 7 is OFF, step S407 is selected as the next step, where the control signal ON is supplied to the by-pass valve 17 for opening the by-pass route 18 during the diagnosis operations, and step S408 is selected next. In step S408, the correlation function of the output signals from the first and third air/fuel ratio sensors 6 and 8 or from the second and third air/fuel ratio sensors 7 and 8 is calculated.

And furthermore, in step S409. the correlation function value calculated in step S408 for anyone of the catalysts is compared with the predetermined degradation judging level. In case that the calculated correlation function value is proved to exceed the degradation judging level, what is concluded is the fact that the catalyst is degraded, and next in step S410, this status is displayed, for example, reported to the driver by lighting the alarm signal.

If step S405 concludes that the diagnosis region for the down stream catalyst 10 is not established, step S410 is selected for going back to the initial step of the flowchart and restarting the control program.

In addition, in step S411, the judging result is stored in the memory. According to this embodiment, as the individual catalysts including the upper stream catalyst 9 and the down stream catalyst 10 can be treated as a single catalyst, the diagnostic operation for each catalyst can be independently performed easily.

As well understood from the above description, in spite that the diagnostic apparatus of the exhaust gas clarification apparatus of the present invention is applied to the exhaust gas clarification apparatus having a plurality of catalysts, this diagnostic apparatus enables the individually independent diagnosis of each catalyst by estimating the correlation function of the output signals from the air/fuel ratio sensors located before and after the individual catalyst in the distinctive operation region for the individual catalyst.

What is claimed is:

1. An internal combustion engine having means for detecting operation status thereof and an air/fuel ratio control regulating an amount of fuel injection in response to the detected operation status so as to keep an air/fuel ratio in the exhaust gas thereof at a predetermined value, a diagnosis device for an exhaust gas clarification arrangement including a first exhaust gas clarification catalyst unit disposed at an upstream side and a second exhaust gas clarification catalyst unit disposed at a downstream side in an exhaust gas passage in the internal combustion engine, comprising:

a by-pass passage configured to bypass the first catalyst unit; a bypass valve configured to switch exhaust gas flow between through the first catalyst unit and through the bypass passage; a first air/fuel ratio sensor located at an upstream side of the bypass valve; a second air/fuel ratio sensor located at one of an upstream side and at a downstream side of the outlet of the bypass passage in the exhaust gas passage; a third air/fuel ratio sensor located at a downstream side of the second catalyst unit in the exhaust gas passage; and a second diagnostic device configured to perform diagnosis of the second catalyst unit based on output signals from said first and third air/fuel ratio sensors when the bypass valve is switched to open said bypass passage to flow the exhaust gas through said bypass passage.

2. An internal combustion engine having means for detecting operation status thereof and an air/fuel ratio control regulating an amount of fuel injection in response to the detected operation status so as to keep an air/fuel ratio in the exhaust gas thereof at a predetermined value, a diagnosis device for an exhaust gas clarification arrangement including a first exhaust gas clarification catalyst unit disposed at an upstream side and a second exhaust gas clarification catalyst unit disposed at a downstream side in an exhaust gas passage in the internal combustion engine, comprising:

a by-pass passage configured to bypass the first catalyst unit; a bypass valve configured to switch exhaust gas flow between through the first catalyst unit and through the bypass passage; a first air/fuel ratio sensor located at an upstream side of the bypass valve; a second air/fuel ratio sensor located at one of an upstream side and at a downstream side of the outlet of the bypass passage in the exhaust gas passage; a third air/fuel ratio sensor located at a downstream side of the second catalyst unit in the exhaust gas passage; and a first diagnostic device configured to perform diagnosis of the first catalyst unit based on output signals from said first and second air/fuel ratio sensors when the bypass valve is switched to close the bypass passage to flow the exhaust gas through the first unit, and a second diagnostic device configured to perform diagnosis of the second catalyst unit based on output signals from said first and third air/fuel ratio sensors when said bypass valve is switched to open said bypass passage to flow the exhaust gas through said bypass passage.

3. The diagnosis device according to claim 2, wherein said first diagnostic device is configured to perform the diagnosis of the first catalyst unit under a first operation region of the internal combustion engine, and said second diagnostic device is configured to perform diagnosis of the second catalyst unit under a second operation region of the internal combustion engine of which load is different from that of the first operation region.

4. The diagnosis device according to claim 2, wherein said first diagnostic device is configured to perform the diagnosis of the first catalyst unit under a first operation region of the internal combustion engine, and said second diagnostic device is configured to perform diagnosis of the second catalyst unit under a second operation region of the internal combustion engine of which load is larger than that of the first operation region.

* * * * *